(12) United States Patent
Matsuura

(10) Patent No.: US 6,220,322 B1
(45) Date of Patent: Apr. 24, 2001

(54) PNEUMATIC TIRE INCLUDING TIE BARS

(75) Inventor: Shinichi Matsuura, Kobe (JP)

(73) Assignee: Sumitomo Rubber Industries, Ltd., Hyogo-ken (JP)

(*) Notice: Subject to any disclaimer, the term of this patent is extended or adjusted under 35 U.S.C. 154(b) by 0 days.

(21) Appl. No.: 09/247,514

(22) Filed: Feb. 10, 1999

(30) Foreign Application Priority Data

Feb. 12, 1998 (JP) .................................................. 10-029905

(51) Int. Cl.[7] .......................... B60C 11/11; B60C 11/13; B60C 101/00; B60C 103/00; B60C 107/00
(52) U.S. Cl. ...................................... 152/209.22; 152/902
(58) Field of Search ........................ 152/209.18, 209.22, 152/902

(56) References Cited

U.S. PATENT DOCUMENTS

| D. 57,124 | * | 2/1921 | Githens | 152/209.22 |
| D. 76,886 | * | 11/1928 | Nesmith | 152/209.22 |
| D. 78,245 | * | 4/1929 | Wullenweber | 152/209.22 |
| 1,504,694 | * | 8/1924 | Litchfield | 152/209.22 |
| 5,088,536 | * | 2/1992 | Graas et al. | 152/209.22 |
| 5,211,779 | * | 5/1993 | Tomioka et al. | 152/902 |
| 5,353,854 | * | 10/1994 | Landers et al. | 152/DIG. 3 |
| 5,439,040 | * | 8/1995 | Iwamura et al. | 152/209.22 |
| 5,814,169 | * | 9/1998 | Yamaguchi et al. | 152/DIG. 3 |

FOREIGN PATENT DOCUMENTS

| 62-4608 | * | 1/1987 | (JP) | 152/209.22 |
| 62-4610 | * | 1/1987 | (JP) | 152/209.22 |

* cited by examiner

Primary Examiner—Steven D. Maki
(74) Attorney, Agent, or Firm—Birch, Stewart, Kolasch & Birch, LLP

(57) ABSTRACT

A pneumatic tire comprises a central longitudinal groove in a tread crown region and an outer longitudinal groove in each tread shoulder region, the longitudinal grooves are crossed by lateral grooves to form crossings and to define blocks on each side of each longitudinal groove, the outer longitudinal grooves are provided near the crossings with tie-bars, the length Tc of each of which is 10 to 40% of the average length of the longitudinal edges of two blocks axially adjacent to the tie-bar, each length measured along the longitudinal groove. Preferably, the lateral grooves in the crown region provided near the crossings with tie-bars, the length Ta of each of which is 10 to 40% of the average length of the lateral edges of two blocks circumferentially adjacent to the tie-bar, each length measured along the lateral groove.

9 Claims, 4 Drawing Sheets

PNEUMATIC TIRE INCLUDING TIE BARS

The present invention relates to a pneumatic tire, more particularly to a tread portion improved in wear resistance.

BACKGROUND OF THE INVENTION

In pneumatic tires provided with a block type tread pattern comprising a number of blocks, uneven wear, e.g. so called heel/toe wear, shoulder wear and the like is liable to occur. The heel/toe wear is an uneven wear between the heel and toe or the rear and front edges of the blocks. The shoulder wear is an uneven wear between the tread crown region and tread shoulder region, in which the wear is larger in the shoulder region than the crown region.

IN THE DRAWINGS

FIG. 4 shows the ground contacting area of a block pattern tire which is viewed from the road side, wherein the direction and magnitude of movement of tread rubber at various points (a)–(p) during traveling towards the direction S are indicated by a vector.

In general, as shown in FIG.4, at the points on the blocks b2 located in the shoulder region, the tread rubber moves toward the tire equator. However, at the points on the blocks b1 in the crown region, the movements are in the circumferential direction rather than the axial direction. If the magnitude of movement is large, the wear is liable to become large.

OBJECTS OF THE INVENTION

It is therefore, an object the present invention to provide a pneumatic tire, in which uneven wear and wear resistance are effectively improved.

SUMMARY OF THE INVENTION

According to one aspect of the present invention, a pneumatic tire comprises a tread portion comprising a pair of shoulder regions and a crown region therebetween, each region provided with a longitudinal groove extending continuously in the tire circumferential direction, the longitudinal groove being crossed by lateral grooves to form crossings and to define blocks on each side of the longitudinal groove, the longitudinal grooves in the shoulder regions being provided near the crossings with tie-bars, each having a length Tc of from 10 to 40% of the average length of the longitudinal edges of two blocks axially adjacent to the tie-bar, each length measured along the longitudinal groove.

DESCRIPTION OF THE SPECIFIC EMBODIMENTS

Embodiments of the present invention will now be described in detail in conjunction with the accompanying drawings.

DESCRIPTION OF THE DRAWINGS

FIG. 2(*b*) is a cross sectional view of taken along a line B—B of FIG. 1.

DETAILED DESCRIPTION OF THE INVENTION

According to the present invention, a pneumatic tire comprises a tread portion 2, a pair of axially spaced bead portions, and a pair of sidewall portions extending between the tread edges and the bead portions. Usually, the tire is reinforced with a bead core disposed in each of the bead portions, a carcass ply extending between the bead portions through the tread portion and sidewall portions, and a belt disposed radially outside the carcass in the tread portion.

Here, a tread is defined as a region between the tread edges E. The tread edges E are the axially outmost edges of the ground contacting area under a standard loaded condition in which the tire is mounted on a standard rim and inflated to a standard load and then loaded with a standard load. The standard rim is the "standard rim" specified in JATMA, the "Measuring Rim" in ETRTO, the "Design Rim" in TRA or the like. The standard pressure is the maximum air pressure in JATMA, the "Inflation Pressur" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread portion 2 is provided with at least three longitudinal grooves extending continuously in the circumferential direction. The longitudinal grooves include a central longitudinal groove 3*a* disposed in a crown region Cr and an axially outer longitudinal groove 3*b* disposed in each of two shoulder regions Sh. The crown region Cr is a central third part of the tread with respect to the width in the axial direction, and each of the shoulder regions Sh is a third part of the tread on each side of the crown region Cr.

The longitudinal grooves 3*a* and 3B preferably have a width in the range of from 2.5 to 7% of the tread width or the width between the tread edges E.

Each longitudinal groove 3*a*, 3*b* is crossed by lateral grooves 4 arranged at intervals in the circumferential direction so as to form a plurality of blocks 5*a*, 5*b* on each side of the longitudinal groove 3*a*, 3*b* and to form a plurality of crossings 6, 10 along the longitudinal groove.

The lateral grooves 4 preferably have a width in the range of from 1.5 to 6% of the tread width.

Figure 1:
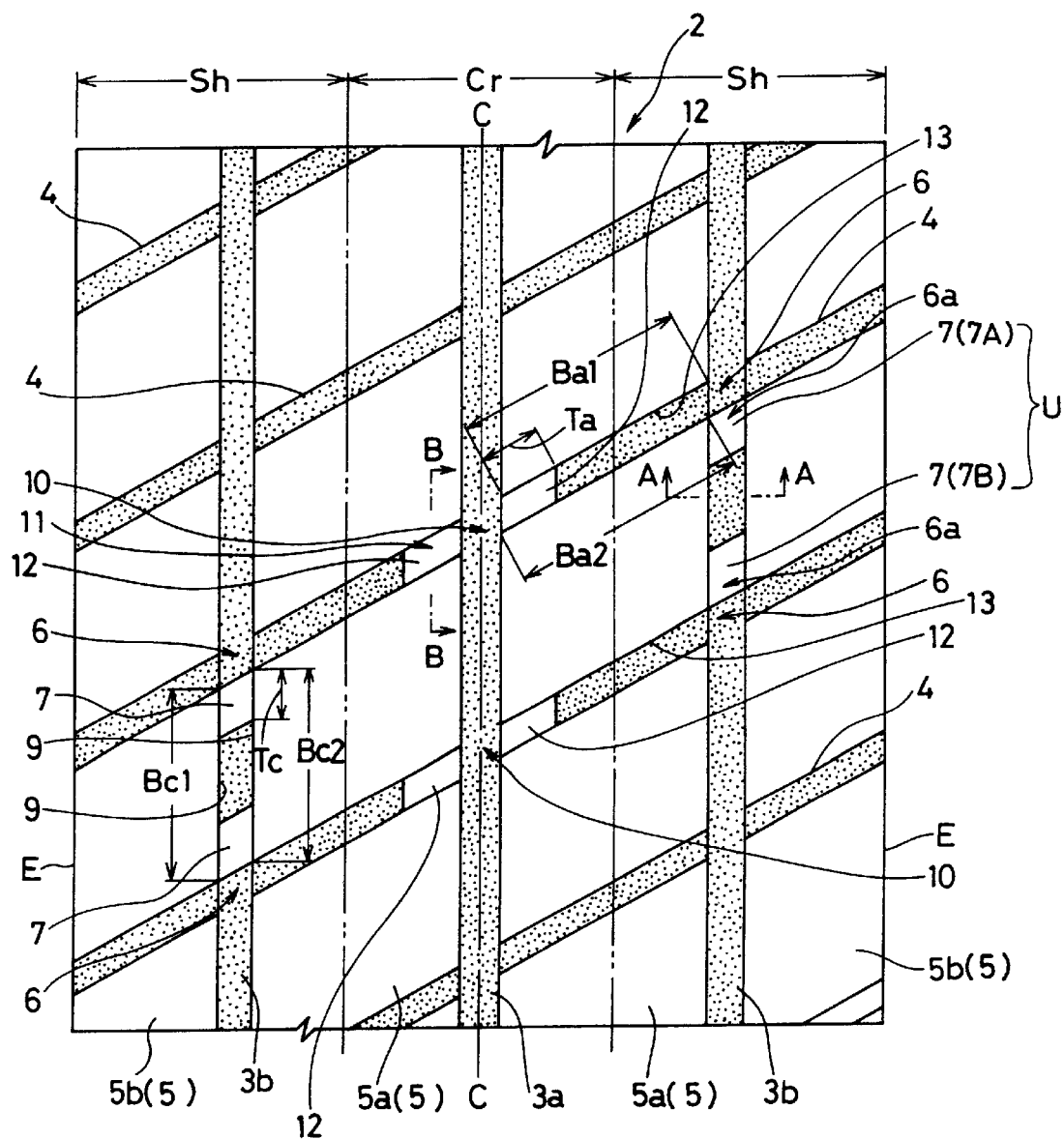
FIG. 1 is a developed plan view of an embodiment of the present invention.
Figure 3:
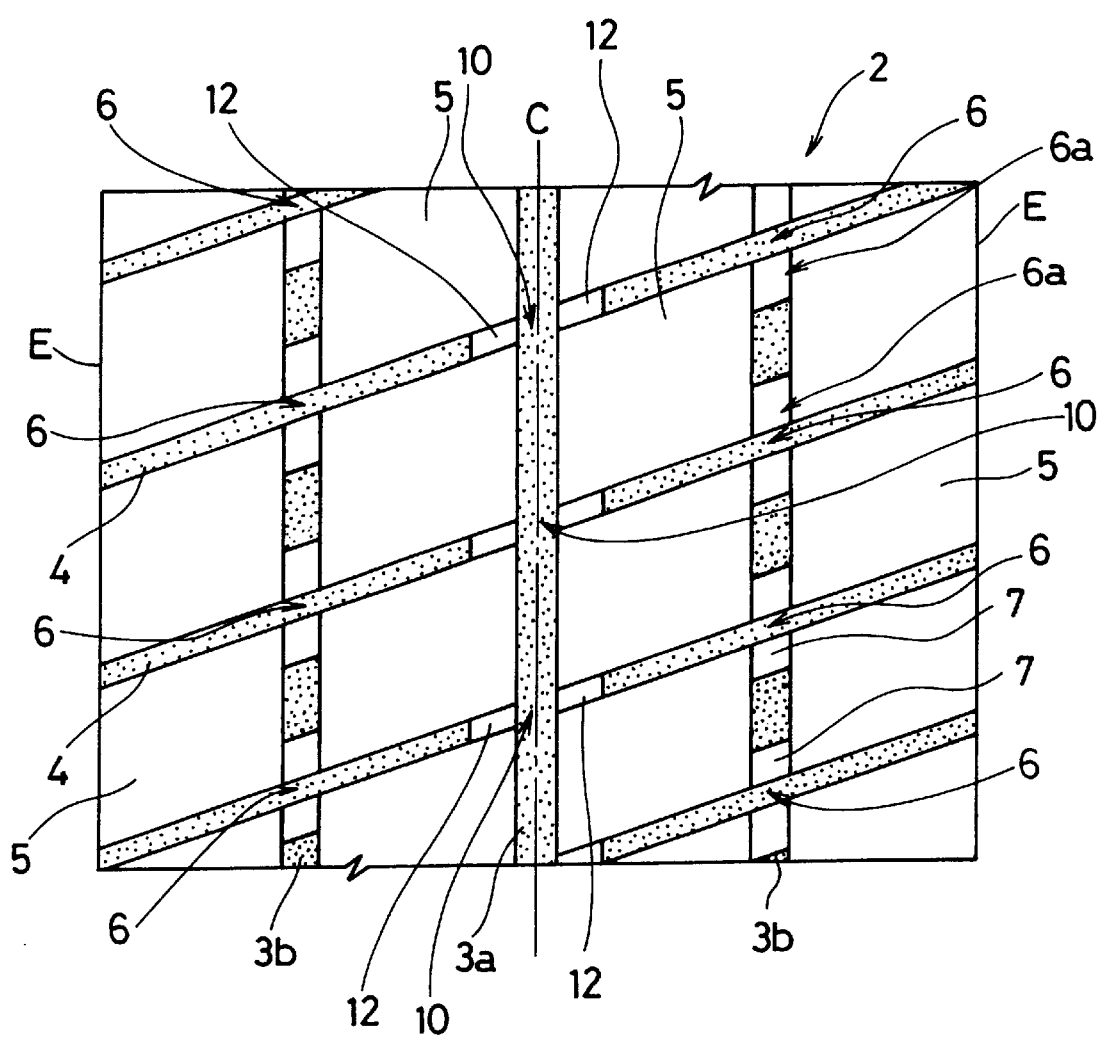
FIG. 3 is a developed plan view of another embodiment of the present invention.

In the embodiments shown in FIGS. 1 and 3, the lateral grooves 4 extend continuously from one of the tread edges E to the other and are inclined with respect to the tire axial direction towards the same direction to have, for example, a right side upward inclination. In each of the regions Cr and Sh, only one longitudinal groove 3*a*, 3*b* is disposed. The central longitudinal groove 3*a* in the crown region Cr is disposed on the tire equator C. Therefore, the tread portion 2 is divided into axially inner blocks 5*a* between the central longitudinal groove 3*a* and the axially outer longitudinal grooves 3*b*, and axially outer blocks 5*b* between the axially outer longitudinal grooves 3*b* and the tread edges E.

The longitudinal grooves 3*a* and 3*b* are a straight groove. But, it is possible to use a zigzag groove only or a combination of a straight groove and zigzag groove. Further, it is also possible to dispose two or more longitudinal grooves in one region. For the lateral grooves 4, a straight groove parallel with the tire axial direction, a curved groove and the like may be used.

Figure 2A:
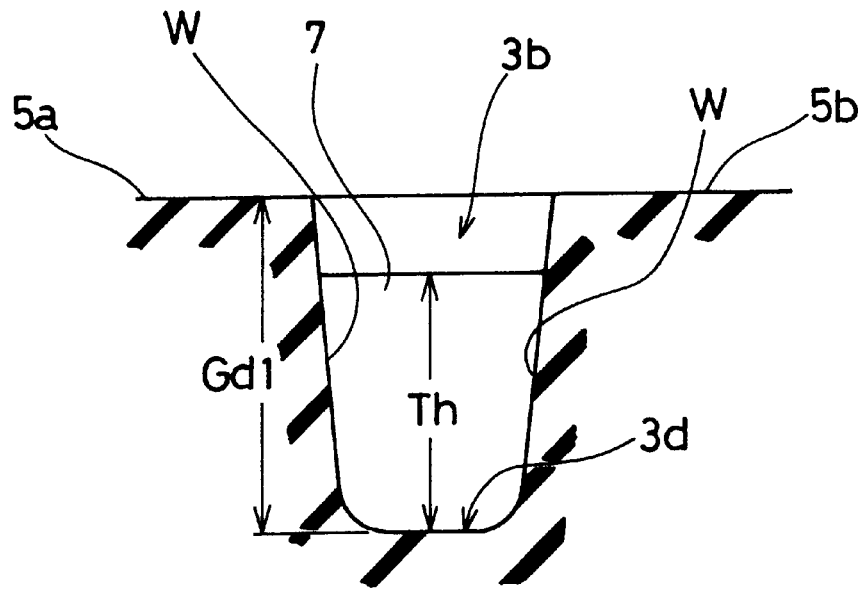
FIG. 2(*a*) is a cross sectional view of taken along a line A—A of FIG. 1.

According to the present invention, the longitudinal grooves 3*b* in the shoulder regions Sh are provided with tie-bars 7. Each tie-bar 7 is disposed in the neighborhood 6*a* of one of the crossings 6 of the grooves 3*b* and 4, but except the crossing 6 so as to connect the walls W of the axially adjacent two blocks 5a and 5b each other. The tie-bar 7 preferably has a length Tc in the range of from 10 to 40%, more preferably 20 to 40% of the average Bc of the lengths Bc1 and Bc2 of the longitudinal edges 9 of the axially adjacent two blocks 5a and 5b, each length measured along the longitudinal groove 3b. As shown in FIG. 2(a), the height Th of the tie-bars 7 measured from the groove bottom 3d is preferably 50 to 100%, more preferably 75 to 100% of the depth Gd1 of the longitudinal groove 3b.

If the length Tc of the tie-bar 7 is less than 10% of the average length Bc, the tie-bar 7 decreases in rigidity, and it becomes difficult to control a large axial movement of the blocks. If more than 40%, the volume of the longitudinal grooves 3b decreases, and wet performance is liable to deteriorate.

If the height Th of the tie-bar 7 is less than 40% of the groove depth Gd1, it is difficult to control the axial movement of the axially outer blocks 5b.

If the tie-bars 7 are disposed in the crossings 6 in the shoulder regions Sh and/or in the lateral grooves 4 in the shoulder regions Sh, the drainage decreases and wet performance deteriorates.

If the tie-bars 7 are remote from the crossings 6, uneven wear increases.

Figure 2B:
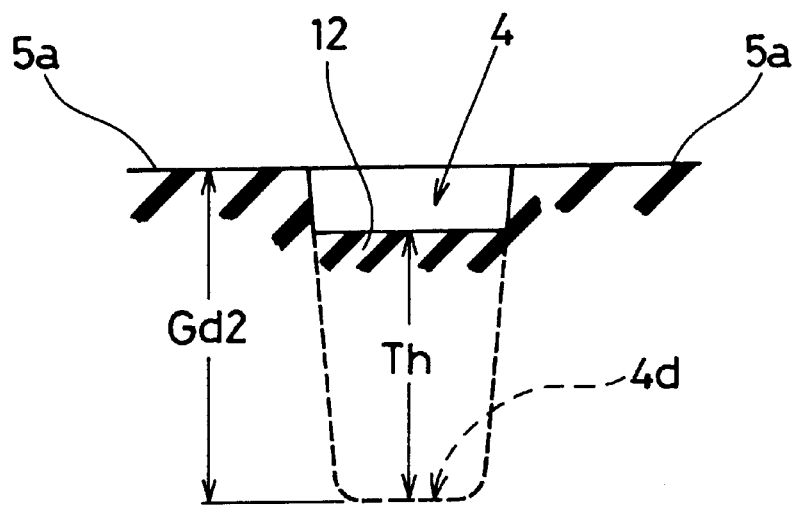

On the other hand, in the crown region Cr, tie-bars 12 are disposed in the lateral grooves 4. Each tie-bar 12 is disposed in the neighborhood 11 of one of the crossings 10 of the grooves 3a and 4, but except the crossing 10 so as to connect the walls of the circumferentially adjacent two blocks 5a each other. The tie-bar 12 preferably has a length Ta in the range of from 10 to 40% of the average Ba of the lengths Ba1 and Ba2 of the lateral edges 13 of the circumferentially adjacent two blocks 5a, each length measured along the lateral groove 4. As shown in FIG. 2(b), the height Th of the tie-bars 12 measure from the groove bottom 4d is preferably 50 to 100% of the depth Gd2 of the lateral groove 4.

If the length Ta of the tie-bar 12 is less than 10% of the average length Ba, it becomes difficult to control circumferential movement of the blocks 5s. If more than 40%, wet performance deteriorates.

If tie-bars are disposed in the longitudinal groove 3a in the crown region Cr, wet performance greatly deteriorates.

With respect to the tie-bars 7 disposed in each of the longitudinal grooves 3b in the shoulder region Sh, the arrangement thereof is such that at least one, preferably not less than two, more preferably not less than three tie-bars 7 always exists in the ground contacting area during running. In the embodiments, between the circumferentially adjacent crossings 6, a pair of tie-bars 7A and 7B are disposed, each adjoining one of the crossings 6. And the edges 13 of the blocks 5a and Sb in the circumferential direction and one edge of the tie-bar 7 are aligned. It is preferable that two tie-bars 7A and 7B always exist in the ground contacting area during running. More preferably, two tie-bars are disposed on both sides of every crossing 6 as shown in FIG. 3.

If two or more longitudinal grooves are disposed in each shoulder region Sh, it may be possible to dispose tie-bars 7 only in the axially outmost longitudinal groove.

With respect to the tie-bars 12 disposed adjacent to each longitudinal groove 3a in the crown region Cr, the arrangement thereof is such that at least one, preferably two or more tie-bars 12 always exists in the ground contacting area during running. More preferably, every crossing 10 is provided on each side thereof with a tie-bar 12 as shown in FIG. 3.

Figure 4:
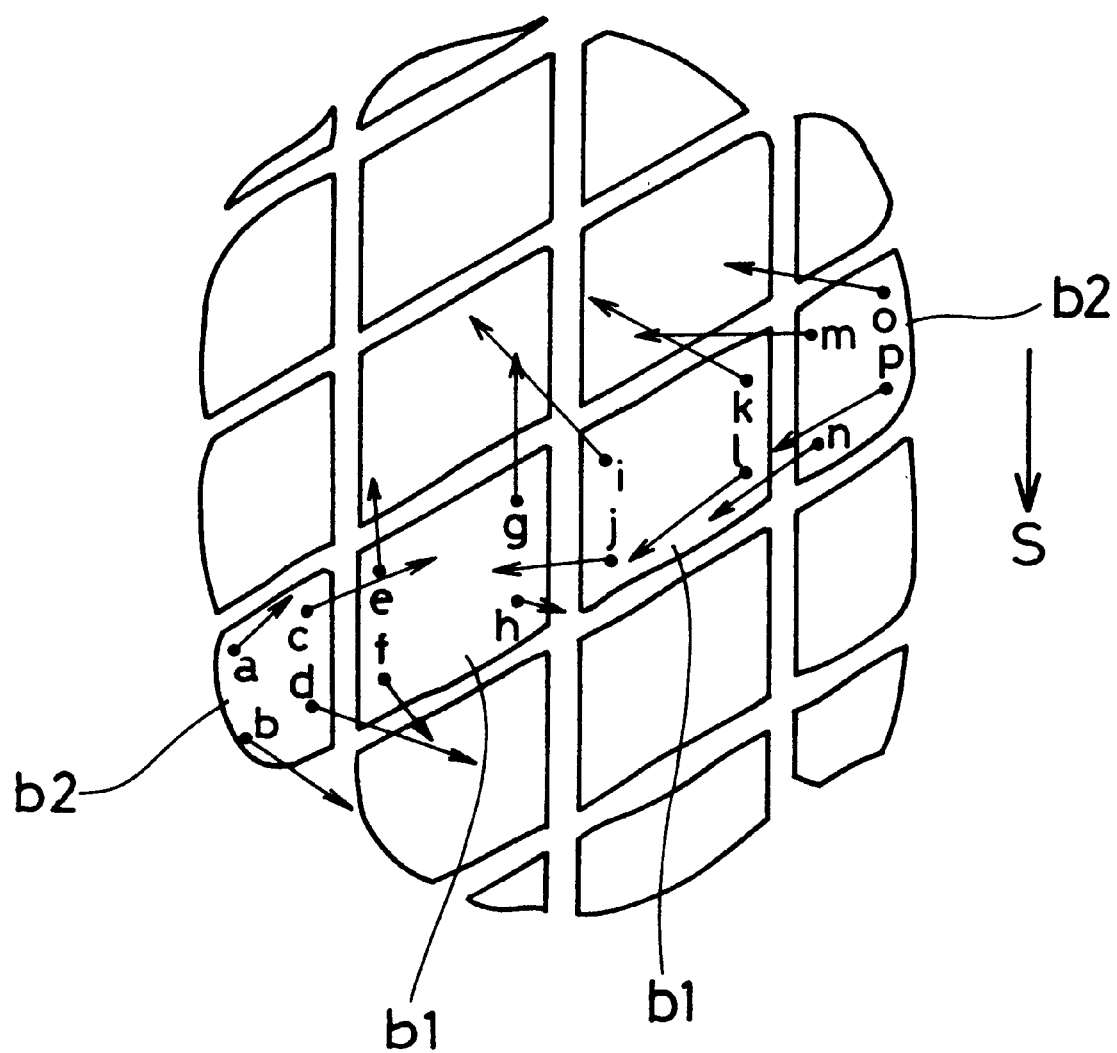
FIG. 4 shows a ground contacting area of a block pattern tire for explaining a typical movement of tread rubber.

The tie-bars 7 prevent the blocks 5a and 5b, especially the axially outer blocks 5b, from moving in the axial direction, whereby the shoulder wear is effectively improved. The tie-bars 12 prevent the axially inner blocks 5a from moving in the circumferential direction, whereby heel/toe wear is effectively improved. By using the tie-bars 7 and tie-bars 12 together, the movements in all directions at the various points (a)–(p) as shown in FIG. 4 can be effectively controlled. Thus, uneven wear such as heel/toe wear and shoulder wear can be effectively improved.

The present invention can be suitably applied to pneumatic tires for passenger cars comprising a radial carcass ply and a belt ply of high elastic modulus cords such as steel cords and the like.

Comparison Tests

Test tires of size 195/65R15 were made and evaluated on the following wear energy: Average wear energy at 16 points (a)–(p) shown in FIG. 4; Shoulder/crown wear energy ratio, which is the ratio of wear energy (Ea+Eb+Eo+Ep) in shoulder region to wear energy (Eg+Eh+Ei+Ej) in crown region; and Toe/heel wear energy ratio, which is the ratio of wear energy (Eb+Ed) in a toe portion to wear energy (Ea+Ec) in a heel portion. Ea, Eb, Ec - - - are the wear energy at the points (a), (b), (c) - - - , respectively.

Wear energy E =Share strain in X-direction X Rubber slip in X-direction+Share strain in Y-direction X Rubber slip in Y-direction The tread patterns were the same as FIG. 3 except for tie-bars. The tie-bars 7 were disposed on both sides, in the circumferential direction, of every crossing 6. The tie-bars 12 were disposed on both sides, in the axial direction, of every crossing 10. The width of the longitudinal grooves 3a and 3b was 4% of the tread width. The width of the lateral grooves 4 was 3% of the tread width.

The specifications and test results are shown in Table 1.

TABLE 1

| Tire | Conv. | Ex. 1 | Ex. 2 | Ex. 3 | Ex. 4 | Ex. 5 | Ex. 6 | Ex. 7 | Ref. 1 | Ex. 8 |
|---|---|---|---|---|---|---|---|---|---|---|
| Longitudinal grooves' Tie-bar | | | | | | | | | | |
| Length Tc/Bc (%) | 0 | 29 | 29 | 29 | 29 | 10 | 20 | 33 | 50 | 29 |
| Height Th/Gd1 (%) | 0 | 100 | 75 | 50 | 25 | 100 | 100 | 100 | 100 | 100 |
| Lateral grooves' Tie-bar | | | | | | | | | | |
| Length Ta/Ba (%) | 0 | 0 | 0 | 0 | 0 | 0 | 0 | 0 | 0 | 29 |
| Height Th/Gd2 (%) | 0 | 0 | 0 | 0 | 0 | 0 | 0 | 0 | 0 | 100 |
| Ave. wear energy (J/sq. m) | 29.7 | 14.9 | 17.4 | 20.6 | 26.1 | 28.5 | 20.8 | 14.9 | 14.5 | 14.7 |
| Sh/Cr wear energy ratio | 0.6 | 0.7 | 0.6 | 0.6 | 0.5 | 0.6 | 0.6 | 0.7 | 0.7 | 0.7 |
| Toe/Heel wear energy ratio | 2.2 | 2 | 2.1 | 2.1 | 2.2 | 2.2 | 2.1 | 2 | 2 | 1.3 |

From the test results, it was confirmed that, in comparison with Conventional tire, Example tires were greatly decreased in the average wear energy.

By using the tie-bars 7 in the longitudinal-grooves and the tie-bars 12 in the lateral grooves together, the resistance to shoulder wear could be improved by about 10 to 14% in comparison with the tires provided with the tie-bars only.

Further, when only the tie-bars 12 were provided, heel/toe wear became liable to occur on the blocks 5a in the crown region Cr.

When tie-bars were disposed in only the lateral grooves in the shoulder regions, it was difficult to fully suppress the axial movement of the axially outer blocks.

What is claimed is:

1. A pneumatic tire comprising a tread portion, said tread portion comprising three equiwidth regions of a pair of shoulder regions and a crown region therebetween, each region provided with a longitudinal groove extending continuously in the tire circumferential direction, each said longitudinal groove crossed by lateral grooves to form crossings and to define blocks on each side of the longitudinal groove, in the shoulder regions, the longitudinal grooves provided near the crossings with tie-bars, the length $T_c$ of each tie bar being 10 to 40% of the average length of the longitudinal edges of two blocks axially adjacent to the tie-bar, each length measured along the longitudinal groove, in the crown region, the longitudinal groove being a straight groove not provided with a tie-bar, the lateral grooves provided near the crossings with tie-bars, the length Ta of each tie-bar being 10 to 40% of the average length of the lateral edges of two blocks circumferentially adjacent to the tie-bar, each length measured along the lateral groove.

2. The pneumatic tire according to claim 1, wherein the tie-bars in each of the longitudinal grooves in the shoulder regions are arranged such that at least one tie-bar always exists in the ground contacting area.

3. The pneumatic tire according to claim 1, wherein the tie-bars are disposed on both sides, in the circumferential direction, of each of the crossings in the shoulder regions.

4. The pneumatic tire according to claim 1, wherein every crossing is provided with two tie bars adjacent thereto.

5. The pneumatic tire according to claim 1, wherein the longitudinal grooves in the shoulder region are straight.

6. The pneumatic tire according to claim 1, wherein the lateral grooves extend straight from one of the tread edges to the other.

7. The pneumatic tire according to claim 1, wherein the lateral grooves are inclined towards the same direction.

8. The pneumatic tire according to claim 1, wherein the blocks are in the form of a parallelogram.

9. The pneumatic tire according to claim 1, wherein the in the shoulder regions the lateral grooves are not provided with the tie-bars.

* * * * *